March 8, 1960 E. J. VON HEIDENSTAM 2,927,452
IMPROVEMENTS IN STORAGE PLANTS
Filed Jan. 3, 1955 7 Sheets-Sheet 1

Inventor
Erik J. von Heidenstam
by Commers + Young
Attorneys

March 8, 1960     E. J. VON HEIDENSTAM     2,927,452
IMPROVEMENTS IN STORAGE PLANTS

Filed Jan. 3, 1955     7 Sheets-Sheet 2

Inventor
Erik J. von Heidenstam
by Sommers & Young
Attorneys

Inventor
Erik J. von Heidenstam
by Sommers & Young
Attorneys

March 8, 1960  E. J. VON HEIDENSTAM  2,927,452
IMPROVEMENTS IN STORAGE PLANTS
Filed Jan. 3, 1955  7 Sheets-Sheet 4

Inventor
Erik J. von Heidenstam
by Sommers & Young
Attorneys

March 8, 1960  E. J. VON HEIDENSTAM  2,927,452
IMPROVEMENTS IN STORAGE PLANTS
Filed Jan. 3, 1955  7 Sheets-Sheet 5

Inventor
Erik J. von Heidenstam
by Sommers & Young
Attorneys

March 8, 1960 E. J. VON HEIDENSTAM 2,927,452
IMPROVEMENTS IN STORAGE PLANTS
Filed Jan. 3, 1955

Inventor
Erik J. von Heidenstam
by Sommers & Young
Attorneys

United States Patent Office 2,927,452
Patented Mar. 8, 1960

2,927,452
IMPROVEMENTS IN STORAGE PLANTS
Erik Johan von Heidenstam, Stockholm, Sweden
Application January 3, 1955, Serial No. 479,601
Claims priority, application Sweden January 22, 1954
10 Claims. (Cl. 72—6)

In the building of storage plants consisting of a great number of vertical cells with rectangular or square horizontal section, it is well known to prestress the reinforcement of the walls. For this purpose, when the walls are being erected, for example by casting using sliding moulds, horizontal thin-walled sheet-iron tubes are cast into the walls, and after the casting has been completed, groups of high-test reinforcing rods are inserted into such tubes and stressed, and finally are cast into mortar introduced into the tubes under pressure. However, it has turned out that in silos thus constructed, the work, for reasons hereinafter described, is difficult and time-consuming, and therefore the technical effects attained are difficult to obtain and expensive.

The chief purpose of this invention is to simplify the construction of multi-cell storage plants or silos.

Another purpose of this invention is to lower the costs of construction and erection of such plants to a minimum.

The cells of the storage plant according to the invention are substantially vertical. The invention is characterized in that within at least one group of cells the latter in pairs have common walls, said common walls being under the pressure of a pressing device, which constitutes a polygon of forces or similar closed arrangement of forces acting on the group of cells.

The invention also relates to a method of building the plant.

Several advantages are gained by the invention.

While in earlier known constructions for prestressing silo blocks comprising a smaller or greater number of separate cells, it was necessary to provide all walls absorbing lateral forces with prestressed reinforcement, this invention makes it possible to reduce the reinforcement substantially in the walls absorbing lateral forces. It is even possible entirely to dispense with reinforcement in these walls. This in turn implies still more advantages. Thus the walls of the silo can be erected in two steps, the first step comprising casting the walls by use of sliding moulds, while the reinforcement of the walls, if any, is relatively weak. Since, in all casting of silo walls, including the use of side molds, the work is delayed by the operations of inserting the reinforcement, for which reason it is often necessary to build a special platform in order that the distribution of concrete shall not obstruct the insertion of the reinforcement, it is obvious that the arrangements in the building site can be substantially simplified when working in accordance with the invention. Much time and money is saved by the increased speed of casting.

Moreover, according to the invention great savings in reinforcing irons are possible. If the walls are made of prefabricated units, it is possible according to the invention to form these so as to have a very low weight per unit of surface, whereby a great amount of concrete can be saved. Besides the savings in materials the invention provides an extremely simple method of applying the stressed reinforcement. Still another advantage of this invention is that a silo plant with entirely prestressed and thus tight walls is attained.

Different embodiments of the invention are illustrated in the annexed drawings.

Fig. 17 is a diagram showing the thrust forces acting on the wall element shown in Fig. 16.

Figs. 18, 19, 21, and 22 are vertical sections of small portions of other embodiments of the wall elements in accordance with the invention.

Finally.

Figures 1, 2, 3, 4, 5, 6, 7, 8:
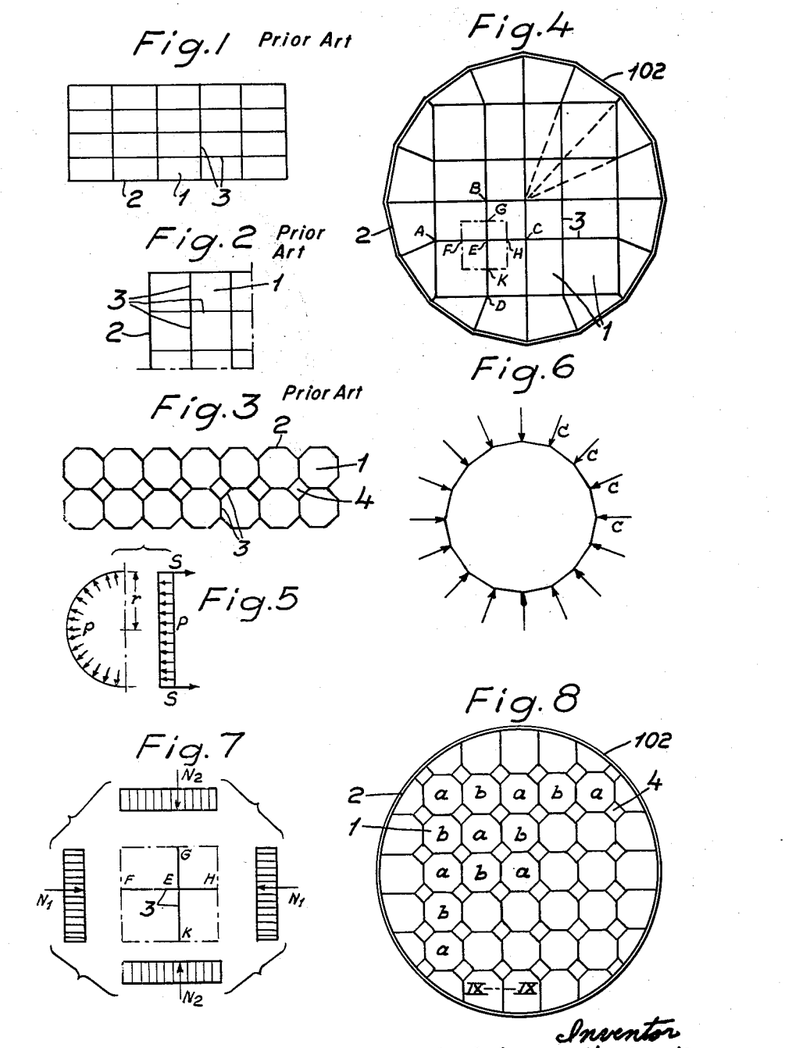
Figs. 1–3 are diagrammatic horizontal sectional views of silo plants of types previously known.
Fig. 4 is a diagrammatic horizontal sectional view of a storage or silo plant in accordance with the invention.
Fig. 5 is a diagrammatic horizontal section through one half of a cylindrical fluid container together with an appurtenant diagram of stresses.
Fig. 6 is a diagrammatic horizontal section of the distribution of the lateral forces in a silo according to Fig. 4.
Fig. 7 is a diagrammatic horizontal section of the distribution of the stresses in a wall portion according to Fig. 4.
Fig. 8 is a diagrammatic horizontal section through another silo according to the invention.

Referring now to Fig. 1 of the drawings, which shows a top view of a storage silo plant previously known, the individual silos consist of cells 1 of rectangular cross-section. These silo cells 1 are enclosed within outer walls 2 and inner walls 3 of concrete. For prestressing the reinforcement irons in a conventional storage plant of this type, thin-walled metal tubes are cast into the walls, and reinforcement irons are then inserted through said tubes front to front in both directions and are prestressed in a well-known manner. This work, however, is both time-consuming and expensive. Furthermore, during the concrete casting, it is difficult to avoid damage to the thin-walled tubes, and it has turned out that in most cases ordinary silos cast by means of sliding moulds and provided with ordinary reinforcement can very well compete with prestressed silos.

Fig. 2 is a horizontal section through a storage plant with square cells. The square is the regular polygon with the greatest number of sides in connection with which the known prestressing methods for silos described in Fig. 1 can be applied.

Fig. 3 is a horizontal section through a storage plant consisting of main cells 1 and smaller secondary cells 4. From the point of view of construction this plant is more advantageous than that shown in Fig. 2 which is due to the fact that the shape of the main cells 1 approximates a circle, which implies that the bending stresses and, thus, also the horizontal reinforcement are reduced. A disadvantage, on the other hand, is that the prestressing of the concrete in a silo plant of such a type is impractical according to methods hitherto known. That such a prestressing cannot be carried out with respect to a storage plant as shown in Fig. 3 is of course due to the fact that in this case there are no walls running rectilinearly through the whole plant, in contrast to Fig. 1.

The silo in Fig. 4 with prestressed concrete walls is constructed in accordance with the present invention. The silo contains a plurality of cells 1 which have either rectangular or square cross-section within the central portion. Outside the cells of the central portion outer cells are located in a ring. The outer walls of the outer cells form the external wall 2 of the silo plant, the corner points of said wall 2 being located on a circle. The adjacent corner points are equidistant from each other around the periphery. Thus, the surrounding wall forms a regular polygon with sixteen sides in the example shown, the points of intersection being placed where the inner walls 3 meet the surrounding wall 2. A stressing device 102 in the shape of reinforcement irons prestressed to a high degree is applied around the surrounding wall.

The distribution of loads in a storage plant in accordance with the invention is shown in Figs. 5-7.

Figure 32:
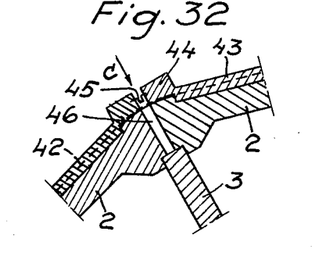
Fig. 32 is a sectional view on a larger scale a detail of Fig. 31.

If the cylinder diagrammatically represented in Fig. 5 is filled with fluid, annular stresses, $S = p \times r$, are generated in its envelope surface, $p$ being the intensity of the equally distributed fluid pressure and $r$ the radius of the cylinder. Fig. 6 diagrammatically represents the forces exerted on the inner walls of the silo by the prestressed reinforcement 102 placed around the polygon-shaped surrounding wall of Fig. 4. Each inner wall 3 connected to the surrounding wall 2 is thus loaded by a pressing normal force C directed towards the center of the circumscribed or inscribed circle for the polygon constituted by the surrounding walls. In Fig. 32 special prestressing devices are shown by means of which the prestressing forces can be entirely directly transferred to the inner walls. The sixteen radially directed forces C consequently actuate the inner walls with a system of forces identical with the force system by which the cylindrical fluid container of Fig. 5 actuates the liquid therein. Thus the system of forces shown in Fig. 6 constitutes an enclosing polygon of forces, which, thus, acts on all inner walls 3, Fig. 4, within it, and Fig. 7 shows an arbitrary wall portion cut out from Fig. 4 together with diagrammatic representation of the forces acting on said wall portion. The portion cut out in Fig. 7 is limited by the center F, G, H, K of the inner walls EA, EB, EC, and ED respectively, Fig. 4. Fig. 7 illustrates that in the empty storage plant, before any of the cells have been filled, the normal forces of the walls extending from the corner E are $N_1 = k \times GK$ respectively, $N_2 = k \times FH$, $k$ being a factor of proportionality and GK and FH, respectively, denoting the distances between the points G and K, and points F and H of Fig. 7. Thus, the system of forces in the inner walls 3 generated by the external forces C in Fig. 6 is extraordinarily well adapted to counterbalance the loads which a material filled into one or more or all cells exert on the silo walls. By choosing the size of the external forces C it is possible to create a practical storage plant in which the many inner walls are provided with only a much reduced reinforcement. In many cases the inner walls even need not be reinforced.

In Fig. 8 the surrounding wall is circular. Its component parts shall be so stiff that they act as beams and transmit to the connecting points of two adjacent inner walls, a pressure acting from the outside and distributed uniformly over the periphery, and preferably in such a manner that the connecting inner walls will be acted upon by forces directed towards the center of the storage plant. The separate parts of the surrounding wall are in this case subjected to bending forces. The cells of the storage silo plant are here of two kinds, namely octagonal primary cells 1 and square secondary cells 4. Thus, the cells are of the same type as those shown in Fig. 3, but there is the great difference that in the construction shown in Fig. 8 reinforcement can be wholly or partly dispensed with in the inner walls.

The walls of the silo plant according to the invention may in some cases advantageously be cast by means of sliding moulds. Thus, considering first the secondary cells 4 the sliding moulds used for these walls may slide upwards, while the moulds used for the octagonal primary cells 1 are at rest. When this has been done, a part of the walls of the large cells 1 may be cast by means of sliding moulds, that is in such a manner that the sliding moulds used for the cells 1 designated by $a$ are raised simultaneously, while thereafter the sliding moulds used for all the primary cells 1 designated by $b$ are raised. By this method it is possible to cast much thinner walls than can otherwise be made. Nevertheless, the walls can be made sufficiently stiff in the lateral direction, for example by introducing prefabricated prestressed beam elements 5 into the walls as can be seen from Fig. 9. This new method of construction combined with casting by means of sliding moulds is rendered possible by the fact that in accordance with the invention the horizontal reinforcement in the walls, if any is used, will be of such a small extent, that on one hand it need not be previously fixed in its position, and on the other hand there will be no necessity for vertical irons to which the other reinforcement irons are to be secured.

Figures 9, 10:
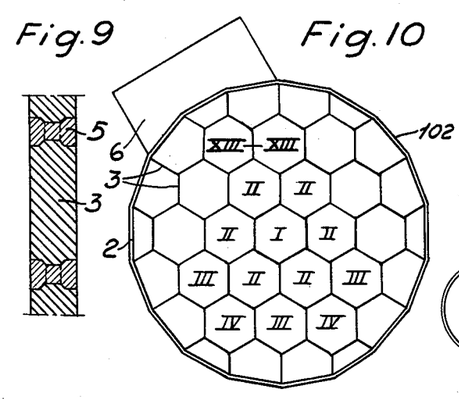
Fig. 9 is a vertical section of a small portion of a silo wall on the line IX—IX in Fig. 8.
Figs. 10–12 are diagrammatic horizontal sections through still other embodiments of the invention.

Fig. 10 shows a preferred embodiment of the invention, the greater part of the cells of which consist of regular hexagons. This implies, that the walls and the cells may be standardized, whether the walls are erected by means of sliding moulds or stationary moulds or built of prefabricated units. While in the embodiments described above (Figs. 4 and 8) the normal force in an inner wall is distributed on at least three adjacent walls, the normal force from one inner wall in this case is in Fig. 10 distributed on only two adjacent, abutting walls. Embodiments of the storage plant with hexagonal silo cells meet completely all requirements occurring in practice with regard to the number and size of the silo units. Starting from a central cell designated by I and surrounding it with six cells designated by II, and enclosing these seven cells, so attained with a surrounding wall, a good silo is obtained. The next step comprises introducing additional cells III and placing the surrounding wall around the aggregate I, II, III. Still another step is to introduce the cells IV and to surround this aggregate I, II, III, IV with a surrounding wall 2, which can run through the extreme corner points of the cells IV or, as shown in Fig. 10, be located at a greater distance from the center. It is, thus, obvious that it is entirely possible to make an arrangement advantageous for each special storing problem based upon a suitable number of central cells with hexagonal cross section. Such a basic series may comprise the following number of cells: 1, 7, 13, 19 (compare Fig. 10), 31, 37, 43, 65 and so on. The number of corners on the circumscribed circle will in the respective cases preferably be as follows: 6, 18, 18, 18, 24, 24, 30, 30, 30. In case the surrounding wall is placed so as to pass through the corner points of the outermost hexagons, the greatest part of the entire cross section of the silo storage plant will be located within the hexagonal cells. In most cases their part of the total section within the surrounding wall amounts to no less than 80–90% which is an ample proof of the high degree of standardization, the great reduction of costs, reduced time of work, and other extra advantages attained by this invention.

The surrounding walls 2 may be made of prefabricated, prestressed slabs, which are so mounted that the surrounding walls exert the desired system of compressing forces on the inside adjacent walls, as described in Fig. 6. The reinforcement can be uniformly distributed, for example, be wound on with comparatively thin reinforcing wires at a short distance from each other. As an alternative a small number of strong reinforcing bands may be used.

In Fig. 10 the reference numeral 6 designates a building connected to the silo, for example for receiving, treating and unloading. In this case the central cell I is supposed not to be used as a storage cell, whereas all the other cells located inside the surrounding wall are storage cells. The cell I may advantageously be used as a shaft for lifts, stairs, etc.

Figure 11:
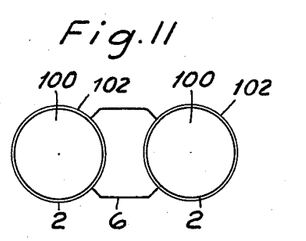
Figure 12:
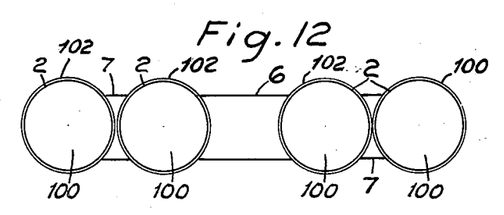

In the modified embodiment shown in Fig. 11 two storage plants 100 in accordance with the invention are placed on either side of a building 6', while Fig. 12 shows four such separate prestressed silos 100 connected by connecting walls 7 and by a building 6'' between two of said silos.

Figure 13:
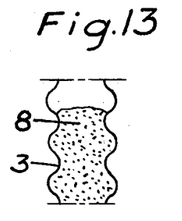
Fig. 13 is a diagrammatic vertical section through a small part of silo wall on the line XIII—XIII in Fig. 10.

Fig. 13 is a diagrammatic vertical section through a part of a silo cell filled to a certain level. The filling material 8 is retained by the walls 3 which are corrugated. Such walls may be cast in situ or may be composed of prefabricated units. As will hereinafter be shown such walls are in certain cases particularly adapted for use in accordance with this invention.

Figures 14, 16:
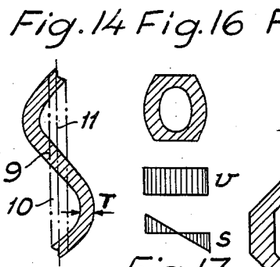
Fig. 14 is a vertical section of a small portion of a prefabricated wall element in accordance with the invention.
Fig. 16 is a section through an equivalent hollow wall element.
Figure 15:
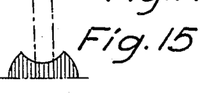
Fig. 15 is a diagram showing the distribution of mass in the element shown in Fig. 14.

Fig. 14 is a vertical sectional view of a small portion of such a prefabricated unit or element 9. In the vertical section this element has the shape of a wave line and the length of the element in the section corresponds to the length of one wave. In the horizontal direction the element may be formed either with straight or curved generatrices. For comparison, there is also shown in Fig. 14, in dash-and-dot lines, a wall unit, or element 10 consisting of a plane disc of uniform thickness. The inner walls of the plants shown in Figs. 4, 8 and 10–12 may be constructed of corrugated elements 9, 9', 9'', 9''' or plane elements 10. Fig. 15 shows diagrammatically the mass distribution in relation to the central plane 11 of the wall of Fig. 14 on the assumption that the total quantity of material is the same in the corrugated element 9 and the plane element 10. The mass distribution for the corrugated element 9 is shown diagrammatically in Fig. 15 in full lines, and sectioned, and for the plane wall unit 10 in dash-and-dot lines. The moment of resistance of the corrugated element W is in the example shown several times greater than that of the plane element. Fig. 16 illustrates how the distribution over the cross section in Fig. 15 corresponds to distribution over the cross section for a hollow beam with extremely high resistance to loads. The imaginary hollow beam in Fig. 16 is, as set forth above in connection with Figs. 4–7, loaded with a uniformly distributed intensity of pressure $v$, when there is no filling material 8 in the silo. When filling material is introduced into one of the two cells, having the wall element 9 in common, this wall element is loaded substantially as a slab having its two ends, viewed in horizontal cross section, placed on supports, whereby there will be moment of flexure, that is, bending stresses in the wall element. Onto the initial, uniform intensity of pressure $v$, there will then be superimposed a system of stresses substantially in accordance with the diagram shown at the bottom of Fig. 17. Without the danger of any tensile stress arising within the wall section, the moment may be increased until the edge tensions amount to the same value as the stresses resulting from the initial pressure $v$. Because the hollow beam, or the I-beam equivalent thereto, renders a more favourable distribution of the masses, a substantially greater moment can be absorbed than in the case of a rectangular section with the same cross-section.

The use of corrugated inner walls in a silo prestressed by an enclosing reinforcement according to the invention, therefore, is of great importance, particularly as the lateral pressure caused by the filling material 8, as is easily seen, will simultaneously be lower in a wall with corrugated surface than in a smooth vertical wall.

However, the favourable force-absorbing ability of the corrugated wall units 9 according to the principle shown in Fig. 14 can be still more increased as can be seen from Fig. 18, which shows a vertical cross section through a small portion of a corrugated wall 9'. Seen in cross-section the two sides of the wall have broken lines and the wall has throughout its entirety a constant thickness $t_h$ in the horizontal direction. Especially when prefabricated wall units are used, the advantage of the constant thickness $t_h$ will be evident, as newly cast, but still not solidified wall units can then be piled (snugly fitting) upon each other, thus, with horizontal generatrices, or be placed side by side, preferably with vertical generatrices. The embodiment shown in Fig. 18 has a still more favourable distribution of the masses than that of Fig. 15 for the corrugated wall unit 9.

Figure 19:
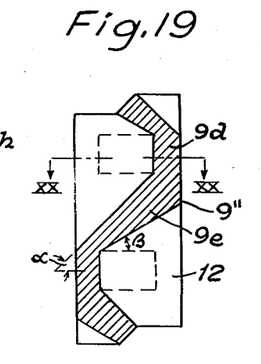
Figure 20:
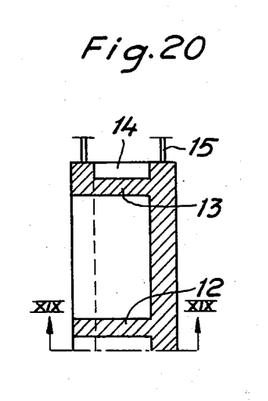
Fig. 20 is a section along the line XX—XX in Fig. 19.

As shown in Fig. 19 the corrugation of the wall unit 9'' comprises a whole wave length 9d designates those parts of the wall unit which are substantially vertical, while 9e indicates portions of the wall unit which extend obliquely. The portions 9e are thicker at the top than at the bottom. They are bounded by an upper side forming an angle $\alpha$ with the horizontal plane and a lower side forming an angle $\beta$ with the horizontal plane. The angle $\alpha$ is preferably equal to or is larger than the angle at which the filling goods in connection with the emptying of the silo can flow completely down the oblique wall, while the angle β preferably equals or is greater than the natural angle of repose for the filling goods, whereby the filling goods when the silo is filled, will completely fill up the silo space, there being no empty, unfilled spaces. The wall unit 9 is provided with stiffening discs 12 and end plates 13, Fig. 20, in which recesses 14 are made which have the function to transmit forces acting vertically upon the wall unit to corresponding supports on pillars on which the wall unit rests. Reinforcement 15 has been laid in. Mountable wall units of the type shown in Figs. 19 and 20 can be placed above one another with or without joining, and thus, constitute a wall-forming slab which, considered as a unit, is preferably entirely corrugated, and is able to absorb the loads from the filling goods in the silo cells with a minimum consumption of material.

Figure 21:
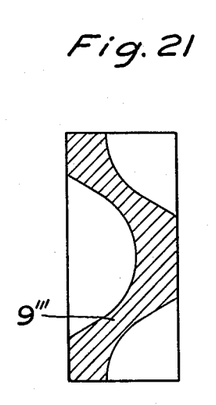

In the simple wall element 9' shown in Fig. 21 the bounding surfaces are partially cylindrical. This embodiment is fitted for manufacture in factories as well as for casting in situ.

Figure 22:
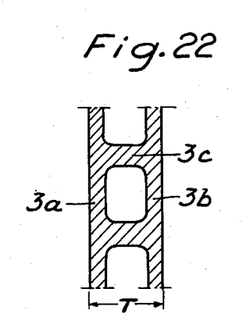
Figure 23:
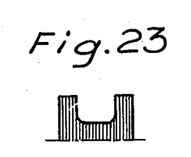
Fig. 23 is a diagram showing the distribution of material in the wall element Fig. 22.

The wall element shown in Fig. 22 is comprised of two plane parallel slabs 3a and 3b united by stiffening transverse ridges 3c. The masses in this element are distributed as shown in the diagram in Fig. 23. This mass distribution corresponds in principle to that shown in Figs. 15 and 16. However, from a practical point of view the wall in Fig. 22 has the great disadvantage that it has an essentially increased thickness T as compared for example with the wall 9 shown in Fig. 14. The corrugated type of wall, thus, yields increased storing space.

Figure 24:
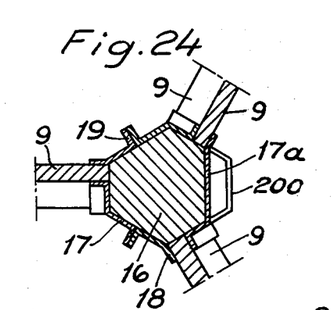
Fig. 24 is a horizontal section through a pillar with connecting walls in accordance with the invention.

Fig. 24 is a horizontal section through three walls united in a point, and forming, for instance, part of a plant of the kind shown in Fig. 10. The walls are here united with a pillar 16 and are made of wall elements 9 which are secured to mould parts 17 within which the pillar 16 is to be cast. The portions 17 are provided with flanges 18 and 19 for being bolted together. To the right in Fig. 24 a mould portion 17a extending from wall to wall is shown as an alternative; said portion is provided with a handle 200 for moving the mould portion successively upwards during the work. In case the wall units are provided with anchoring reinforcement, this is cast into the pillar, when the latter is cast in situ.

Figure 25:
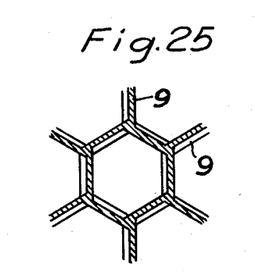
Fig. 25 is a horizontal section through an internal silo cell with connecting walls in accordance with the invention.

Another arrangement of the wall elements is shown in Fig. 25 which shows a horizontal section through a central cell with adjacent walls. The walls are made of corrugated elements 9 of the type shown in Fig. 14, 18, or 21.

Figure 26:
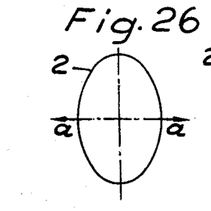
Fig. 26 is a diagrammatic horizontal section of a storage silo.

As shown in Fig. 26 a silo plant as per the invention may be provided with a surrounding or enclosing outer wall 2, which, seen from above, has an elliptical shape. In this and other cases supplementary reinforcement may be used, preferably in those inner walls which extend in the direction a—a in Fig. 26.

Figure 27:
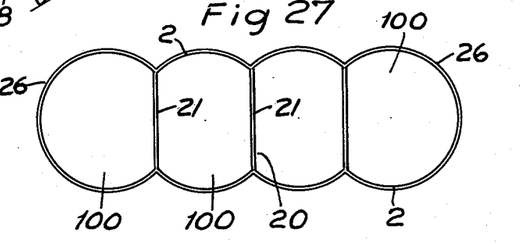
Fig. 27 is a diagrammatic horizontal section through a composite storage silo.
Figure 28:
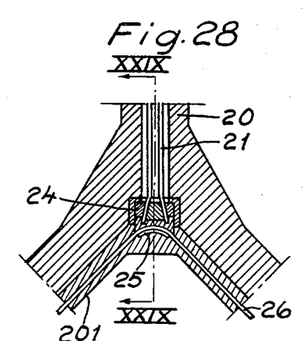
Fig. 28 is an enlarged section of a detail in Fig. 27.
Figure 29:
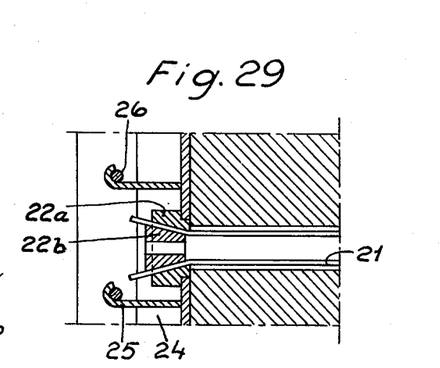
Fig. 29 is an enlarged section along the line XXIX—XXIX in Fig. 28.

As shown in Fig. 27 a silo plant may be combined of a number of prestressed silos 100 in accordance with the invention, constructed, say, in accordance with Figs. 4, 8, and 10, but here transverse walls 20 are added. As shown in detail in Figs. 28 and 29 each transverse wall 20 is provided with prestressed reinforcement 21 secured to end anchorings 22a and 22b which in turn are secured to a vertical beam 24. This beam also carries bent plates 25 forming supports for prestressed reinforcement 26 in the plane of the surrounding walls. The reinforcement 26 is covered with a cement layer 201.

Whether the silo is wholly or partly made by means of sliding molds or by mounting prefabricated units, it is suitable during the time of erection to use an external movable platform, for example, a suspended platform, along which is conveyed the equipment by means of which the reinforcement is wound on the surrounding walls.

Figure 30:
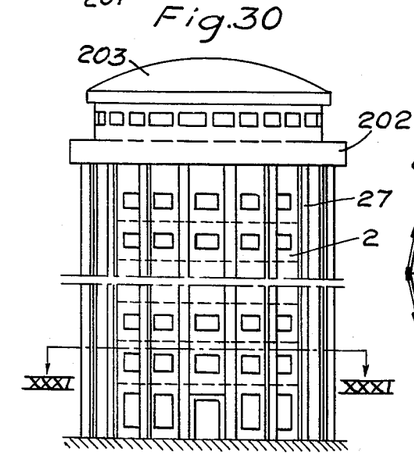
Fig. 30 is a diagrammatic elevation of a silo according to this invention.
Figure 31:
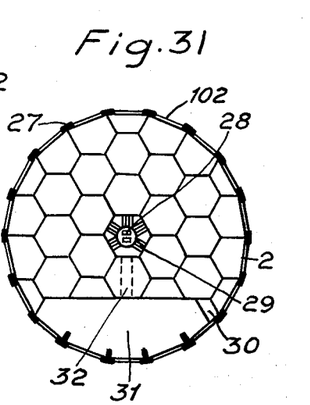
Fig. 31 is a diagrammatic horizontal section along the line XXXI—XXXI in Fig. 30.

In the silo shown in Figs. 30 and 31 the cells may in some cases be open upwards, but in Fig. 30 they are shown as covered by a working platform 202. The distribution of filling material to the various cells is carried out in a simple manner by way of rotatable transport tubes, transport belts, or the like, or other means of transportation going out from the vertical central line of the plant, where the elevators 28 are preferably placed. The top or roof may preferably be comprised of a dome-shaped shell 203.

The plant is preferably provided with external front pillars 27, stairs 29, as well as with a lift 30 communicating with premises 31 where the stored goods are handled. These premises communicate with the central stairs 29 through a passageway 32.

In the silo shown in Fig. 32 two surrounding walls 2 join an inner wall 3. The surrounding walls 2 consist in this case of factory-made, prefabricated, slabs around which a stressed reinforcement 42 is wound which is cast into a layer of concrete or cement plaster 43, which also forms architectonic pilasters or front pillars 44. The interspaces 46 between the walls 2 are water-tightly shut-off from the outer air by means of sealing metal sheets 45. Due to this arrangement the resulting stress C in the stressed reinforcement 42 in the surrounding walls 2 can be transmitted without losses as a centrally directed load acting in the direction of the arrow on the inner wall 3. The surrounding wall may even be cast as a monolithic unit, without hollows 46, but are then preferably made of another concrete material with a lower modulus of elasticity, whereby also the forces from the prestressed reinforcement 42 can be transmitted in an analogous manner towards the center of the inner walls 3 without loss of prestressing forces.

Figure 33:
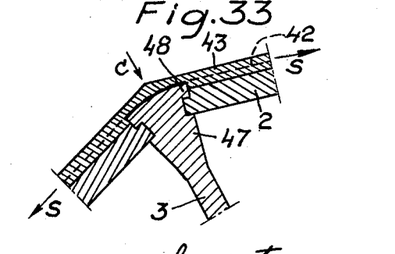
Fig. 33 is a horizontal section of a small portion of a modification of the parts shown in Fig. 32.

In the modification shown in Fig. 33, the inner wall 3 is provided with supports 47 and 48 for the inward portions of the surrounding walls 2, said portions being built of prefabricated slabs, which are preferably made of concrete or some other material with a lower modulus of elasticity than that of the inner walls. A resilient surface layer may alternatively be placed in the recess formed between the supports 47 and 48, which layer prevents substantial compression forces from being transmitted in the peripheral direction. Due to the fact that the stresses C generated by the prestressed reinforcement 42 in the surrounding wall is directly transmitted into the inner walls these inner walls will be prestressed even if they have no reinforcement at all or only a small amount of reinforcement only sufficient to permit transportation of the prefabricated wall element.

In certain cases the stressing may be free between the corners of the surrounding polygon and is then freely laid on the outside of the surrounding walls or concentrated to certain horizontal bands where it is shielded from corrosion without being necessarily rigidly connected with the surrounding walls. When the surrounding walls are made of sheet-iron they may themselves constitute the prestressed horizontal reinforcement when they are stressed sufficiently.

According to the invention the reinforcement within a height section of a surrounding wall—for example as per Fig. 10—can be dimensioned for an annular stress K of such size that $$K = k \times p \times \frac{D}{2} \times h$$

in which $k$ is a factor, $p$ is the lateral pressure from the filling within a silo cell, D is the diameter of the enveloping curve and $h$ is the height of the section and $10 > k > 1$, by preference $5 > k > 1.5$ and particularly $4 > k > 2$.

Figure 34:
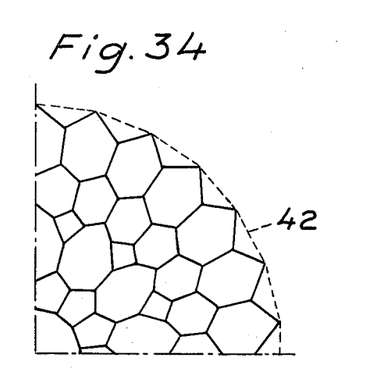
Fig. 34 is a diagrammatic partial horizontal section of a modified storage plant in accordance with the invention.

In the silo shown in Fig. 34 the number of cells is great. The stressing device which may be free and not uncovered, abuts against the projecting corners of the outermost cells and form a polygonal line.

Figure 35:
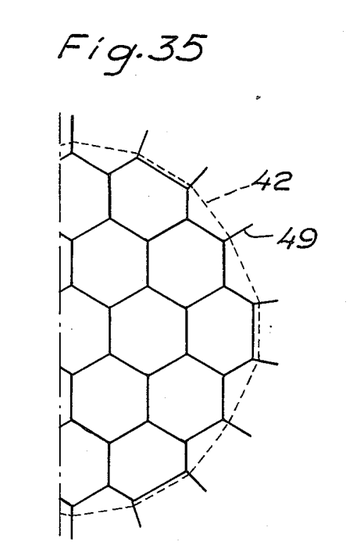
Figs. 35 and 36 are diagrammatic horizontal sections through other modifications.

In the modification shown in Fig. 35 most of the cells are regular hexagons of the same size. Some outer walls 49 are directed radially and provided with holes through which the stressing device 42 is drawn, so that a polygon of forces is formed. The stressing device is uncovered and may consist of wire rope, reinforcement wires or bands or the like.

Figure 36:
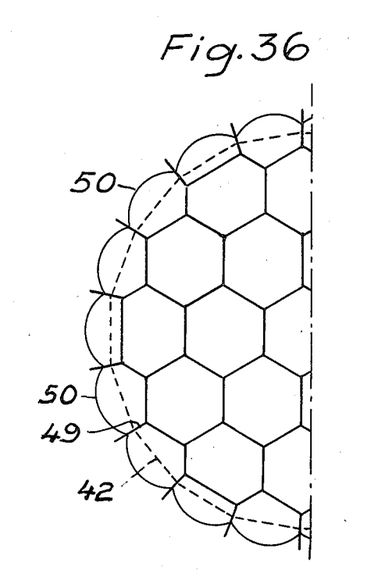
Figures 37, 38, 38A, 39, 40:
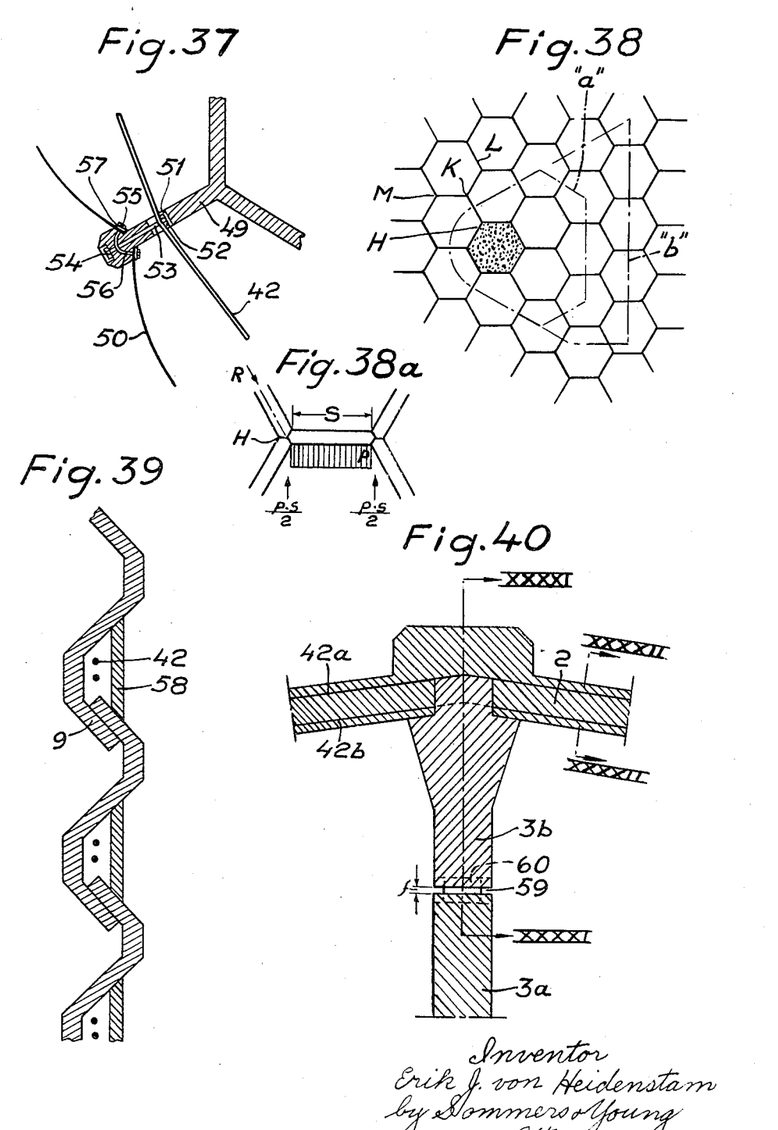
Fig. 37 is a horizontal section of a detail of Fig. 36 on a larger scale.
Fig. 38 is a horizontal section of a detail of a group of cells, in which one cell is filled with grain.
Fig. 38a is a diagrammatic horizontal section, on a larger scale, of a detail of Fig. 38.
Fig. 39 is a vertical section of a portion of an outer wall of a silo in accordance with the invention.
Fig. 40 is a horizontal section through a part of a silo in accordance with the invention.

Fig. 36 illustrates that the stressing device 42 may be covered and protected by means of thin cell walls 50, preferably of sheet aluminum, between the radial outer walls 49. The detail shown in Fig. 37 illustrates how the stressing device 42 passes through a hole 52 in the radial wall 49. At the polygon corner of the stressing device the latter rests on a supporting disc 52 connected with a bolt 53 with a nut 54. By tightening this nut, the device 42 may be stressed to any desired degree. The sheet metal wall 50 may be secured by means of nuts 55 to anchoring irons 56, a covering plate 57 being also provided.

For explaining the acting forces reference is made to Figs. 38 and 38a. In Fig. 38 a group of cells is shown, and one of them is filled, for instance, with grain, as indicated by the dotted surface. A part of this filled cell is shown in Fig. 38a, in which it has been presumed that the walls abut freely against each other and are held together and pressed against each other exclusively by the stressing device, that is, the polygon of forces enclosing the group of cells. No tension forces can be transmitted from one cell wall to another at the contacting edges.

On any side wall of the filled cell a side pressure acts, which is generated by the filling material and has the intensity $p$. If the wall is rigid and has the character of a beam resting on two end supports, these two supports are each acted upon by a force $$\frac{p \cdot s}{2}$$

where $s=$ the length of the side of the hexagon. The load is the same on each of the six side walls. For instance in the corner H, the two walls acted upon by the filling material will exert a pressure on the third wall, which is not in contact with any filling material. This active pressure on the third, free wall must be counteracted by a force of reaction R, to prevent the freely abutting walls from falling apart. To create this force of reaction, there must be two component forces in the next corner K of the same third wall, see Fig. 38. These two component forces in the corner K are originated by compression forces in the two remaining walls M—K, and L—K, respectively, in the same corner K and they render together the resultant force R.

The same reasoning may be applied to all walls, for instance, those within the dash-and-dot line "$a$" in Fig. 38. The same reasoning is valid within each arbitrary border line, for instance, the line "$b$." It is thus obvious that if in plants with cells in the shape of regular hexagons one cell is filled, the whole system of walls outside that filled cell will be put under uniform stress which is thus transmitted to the stressing device outside said walls. Due to symmetry, this stressing device will be uniformly stressed in all parts of its periphery.

In Fig. 39 the outer wall is erected of prefabricated elements 9', substantially of the type shown in Fig. 18. In Fig. 39 the elements overlap and the stressing irons 42 are free, and not cast in concrete between the outer wall 9 proper and covering slabs 58 laid on its inner side.

Figures 41, 42:
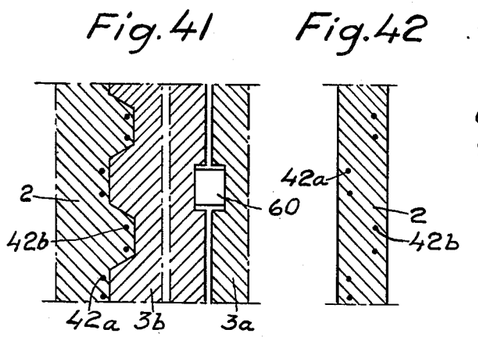
Figs. 41 and 42 are vertical sections on the lines XXXXI—XXXXI and XXXXII—XXXXII, respectively, of Fig. 40.

In the modification shown in Figs. 40–42, the inner walls and also the radially directed outer walls are first erected. These radial walls are made in two parts 3a and 3b separated by a vertical slot or interstice 59. There is, thus, a distance $f$ between the wall parts 3a and 3b. At intervals closed sand boxes 60 are placed between the wall parts 3a, 3b.

The outer wall part 3b has ridges on which the outer reinforcement 42a is laid, while the inner reinforcement 42b is laid in the valleys between them. All reinforcement 42a, 42b is highly stressed, when wound on. Then the enclosing wall 2 is cast, for instance, by means of sliding molds. After the concrete in the wall 2 has solidified and attained the necessary, high strength, the sand boxes are removed, for instance by cutting them open so that the sand flows out. Instead of sand boxes, it is possible to use jacks or wedges, which are released and removed. Now the gap 59 is closed under the action of the stresses in the reinforcement 42a, 42b, and the stresses in the outer and inner walls are reduced to the desired amounts. Thus, the concrete in said walls is prestressed to the desired value. The compression stresses in the inner walls now have a suitable value, equal to $v$ in Fig. 17, for unfilled cells.

The cells may now be filled, say, with grain. Also the outer cells at the outer walls may be filled, without any tensional stresses arising in the prestressed concrete. If such stresses should arise, there is a risk that water will seep in from the outside.

Figure 43:
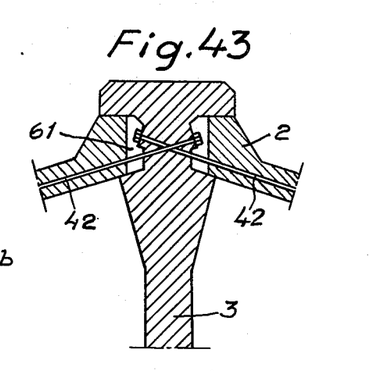
Fig. 43 is a horizontal section, analogous to Fig. 40, through a modified embodiment of the invention.

In the modified embodiment shown in Fig. 43, the irons 42 in the stressing device are drawn through the radial wall 3. By tightening the nuts 61 on said irons the latter are stressed, to prestress the walls 2, 3 to the desired degree.

Figure 44:
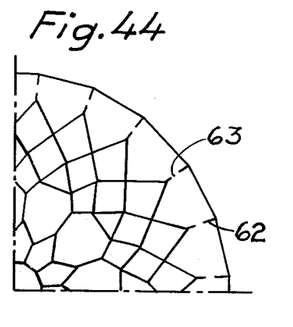
Fig. 44 is a diagrammatic partial horizontal section through a storage silo in accordance with the invention.
Figure 45:
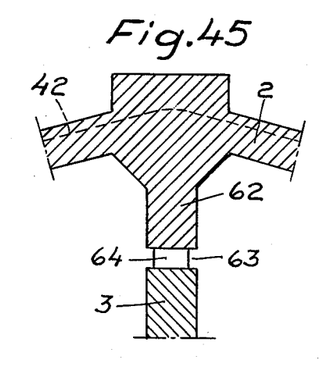
Fig. 45 is a partial horizontal section of a detail of Fig. 44, on a larger scale.

Figs. 44–45 illustrate an embodiment in which the polygonal enclosing wall is provided with inwardly facing projections 62. In the slots or gaps 63 between the wall parts 3a, 3b jacks 64 are arranged in recesses, by means of which the wall parts 3a, 3b are pressed apart and thus the system of inner walls is put under a pressure, directed inwards from the the enclosing polygon 2, 42.

Figure 46:
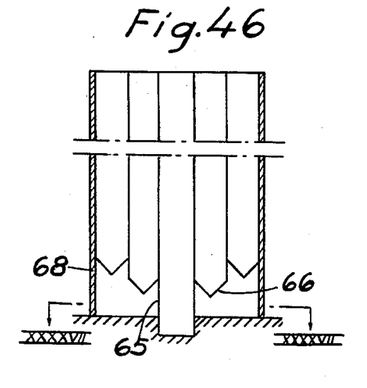
Fig. 46 is a diagrammatic vertical section through a storage silo in accordance with the invention.
Figure 47:
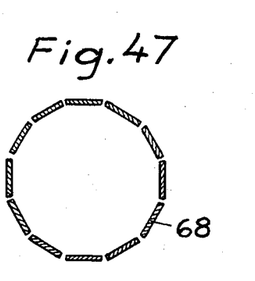
Fig. 47 is a horizontal section on the line XXXXVII—XXXXVII of Fig. 46 the elevator shaft being omitted.

Figs. 46–47 show a storage plant with a central lift or elevator shaft 65. The inner cells around this shaft have bottom hoppers 66. Below the storage cells the outer wall is divided into a number of plane boards which are so made or arranged that even if they are stationarily fixed at the bottom they are movable in the radial direction to at least a part of their length. This is important because radial motions are sometimes necessary, as described above in connection with Figs. 40–41 and 44–45, and also are caused, when the cells are filled or emptied. If pillars are arranged below the silos, they should also be capable of yielding radially in a similar manner.

The stressing device may be cast into concrete, after at least some of the cells have been filled.

Having now described my invention, what I claim as new and desire to secure by Letters Patent is:

1. In a plant for storing material, a bottom, a plurality of walls extending substantially vertically from said bottom and arranged at horizontal angles and joining each other along their edges to form a plurality of central storage cells, an additional first set of substantially vertical walls located outwardly in circumferential relationship to said walls, a second set of additional cell-forming walls extending inwardly of said first set of walls to the junctures of said first-mentioned walls, and a tensioning device acting circumferentially against said second set of walls to place them and the walls of the central storage cells under compression.

2. In a plant for storing material, a floor, a plurality of walls extending substantially vertically from said floor and arranged at horizontal angles to each other and joining each other along their edges, respectively forming a plurality of storage cells, a first set of additionally substantially vertical walls located circumferentially outwardly of said first mentioned walls and forming an outer shell and a second set of walls extending inwardly from said shell and connecting said shell with said first mentioned cells at the adjoining edges thereof respectively, the angles between said inwardly extending walls and the walls of said inner cells at said adjoining edges being between a maximum of 180° and a minimum greater than 90°, and tensioning means extending around said shell and applying compression forces of reaction to all of the said cell-forming walls forming said cells.

3. In a plant for storing material, a bottom, a plurality of walls extending substantially vertically from said bottom and arranged at horizontal angles and joining each other along their edges to form a plurality of central storage cells, an additional first set of substantially vertical walls located outwardly in circumferential relationship to said walls, a second set of additional cell-forming walls extending inwardly of said first set of walls to the junctures of at least some said first mentioned walls, and a tensioning device acting circumferentially against said second set of walls to place them and the walls of the central storage cells under compression.

4. A plant for storing material according to claim 3, and in which the walls of said additional first set of walls are flat.

5. A plant for storing material according to claim 4, and in which said flat walls of said additional first set of walls form a polygon.

6. A plant for storing material according to claim 5, and in which said tensioning device is of the same shape as said polygon.

7. A plant for storing material according to claim 6 and in which said cell forming walls are of prestressed concrete and have horizontally extending ridges and valleys forming corrugations.

8. A plant for storing material according to claim 3 and in which a plurality of tensioning devices are provided extending around the periphery of the plant at vertically spaced intervals of less than the entire height of the plant.

9. A plant for storing material according to claim 5 and in which the polygon has at least five corners.

10. A plant for storing material according to claim 3 and in which the individual storage cells are formed of at least four walls.

References Cited in the file of this patent

UNITED STATES PATENTS

| | | |
|---|---|---|
| 536,435 | MacDonald | Mar. 26, 1895 |
| 1,336,945 | Dickelman | Apr. 13, 1920 |
| 2,326,010 | Crom | Aug. 3, 1943 |

FOREIGN PATENTS

| | | |
|---|---|---|
| 629,872 | Great Britain | Sept. 29, 1949 |
| 1,048,446 | France | Aug. 5, 1953 |
| 31,156 | Denmark | Jan. 11, 1923 |
| 627,793 | France | June 14, 1927 |
| 639,399 | Great Britain | June 28, 1950 |
| 273,004 | Switzerland | Apr. 16, 1951 |
| 673,246 | Great Britain | June 4, 1952 |
| 1,031,807 | France | Mar. 25, 1953 |
| 1,071,604 | France | Mar. 10, 1954 |